Dec. 24, 1957  J. E. KRIEBEL, JR., ET AL  2,817,394
CONVEYOR AND TIRE MOUNTING APPARATUS WITH
AUTOMATICALLY ADJUSTING MOUNTING HEAD
Filed Jan. 24, 1955  4 Sheets-Sheet 2
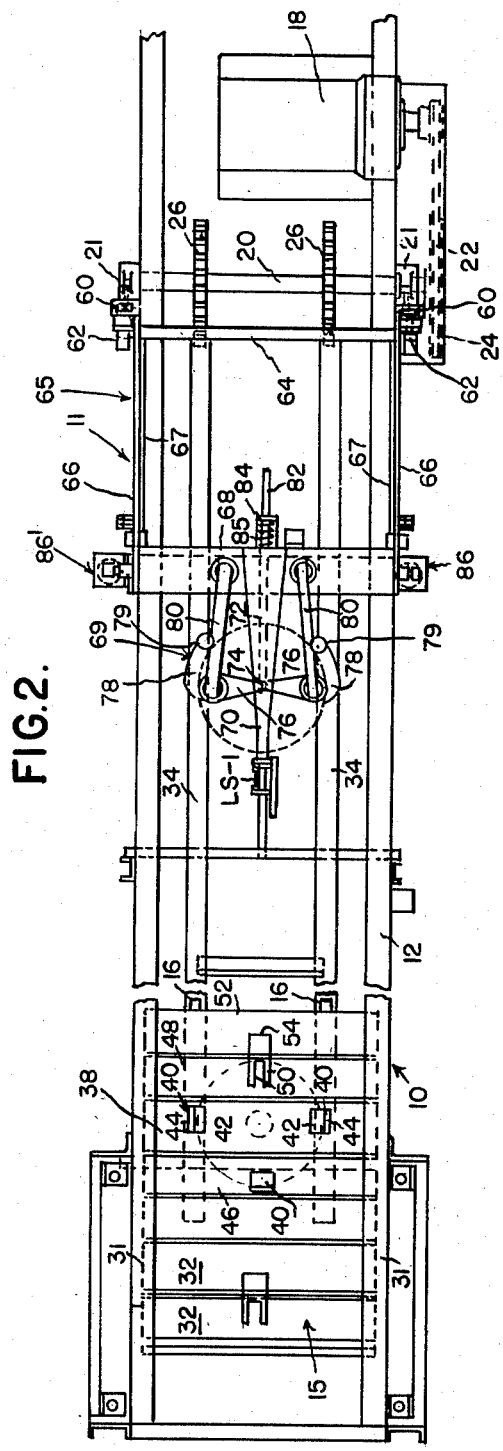
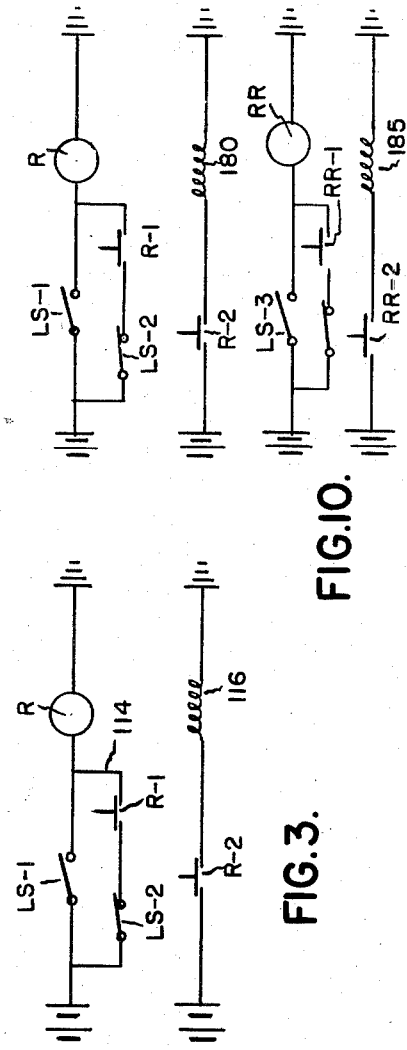
INVENTORS
JOHN E. KRIEBEL JR.
BY MacKELLAR K. GRAHAM
Whittemore, Hulbert & Belknap
ATTORNEYS Dec. 24, 1957  J. E. KRIEBEL, JR., ET AL  2,817,394
CONVEYOR AND TIRE MOUNTING APPARATUS WITH
AUTOMATICALLY ADJUSTING MOUNTING HEAD
Filed Jan. 24, 1955  4 Sheets-Sheet 3

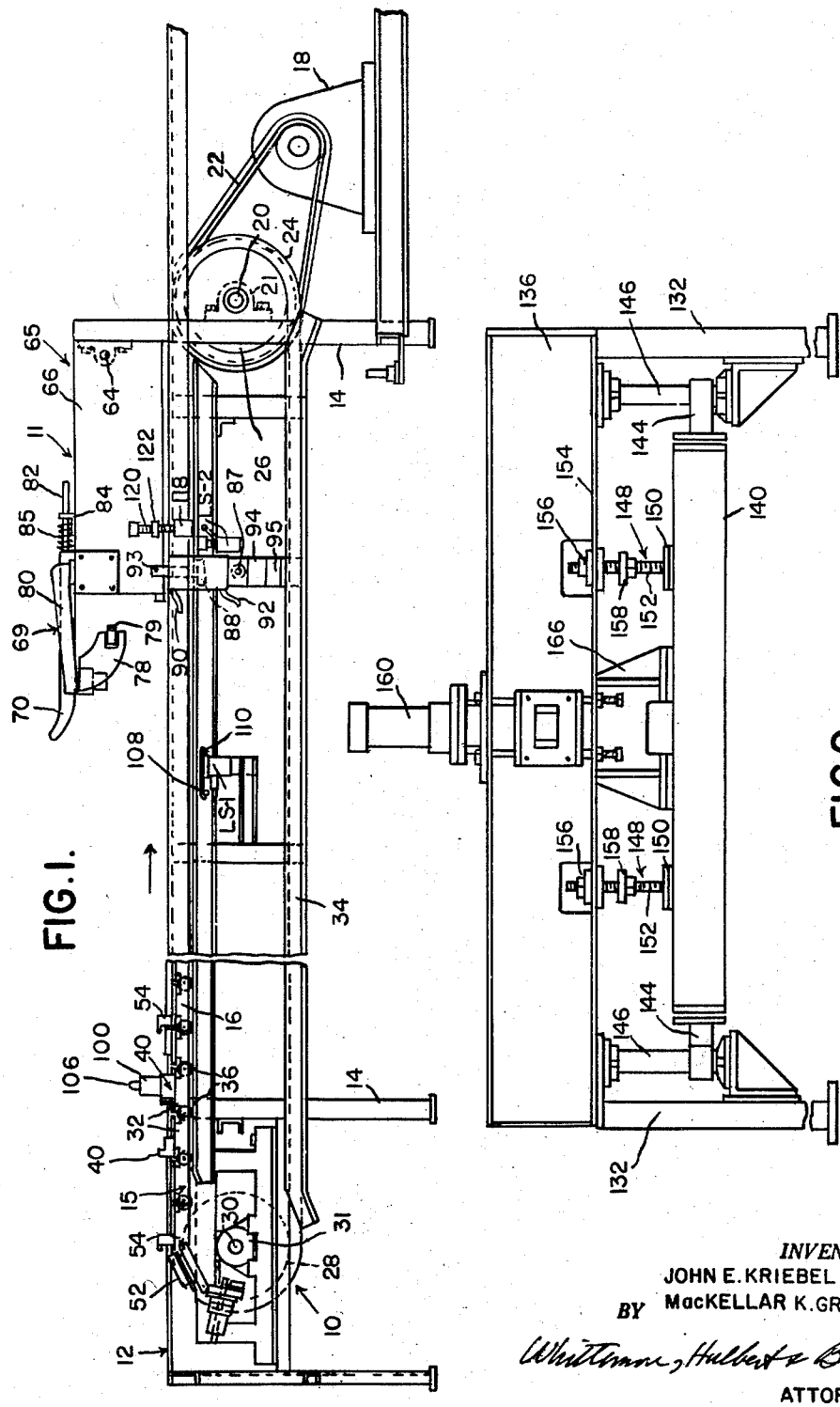

INVENTORS
JOHN E. KRIEBEL JR.
BY MacKELLAR K. GRAHAM

ATTORNEYS

Dec. 24, 1957    J. E. KRIEBEL, JR., ET AL     2,817,394
CONVEYOR AND TIRE MOUNTING APPARATUS WITH
AUTOMATICALLY ADJUSTING MOUNTING HEAD
Filed Jan. 24, 1955                         4 Sheets-Sheet 4
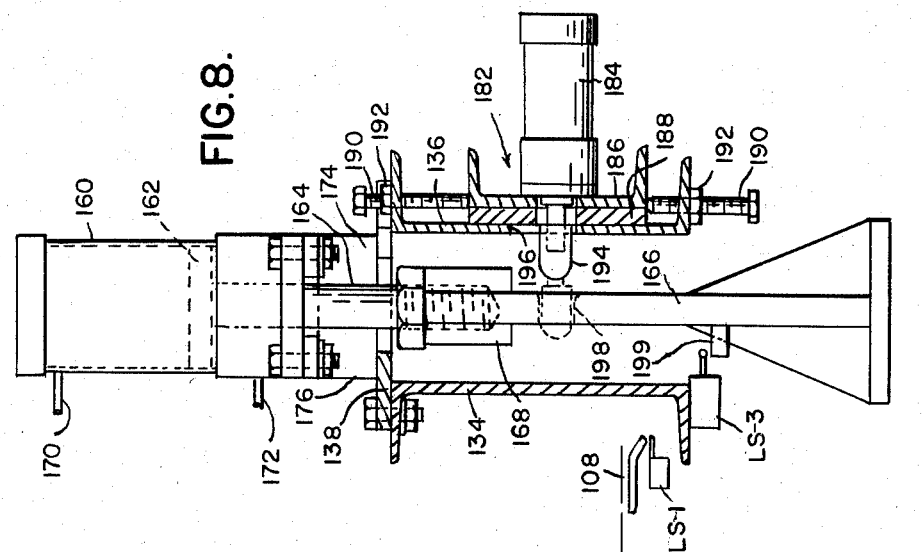
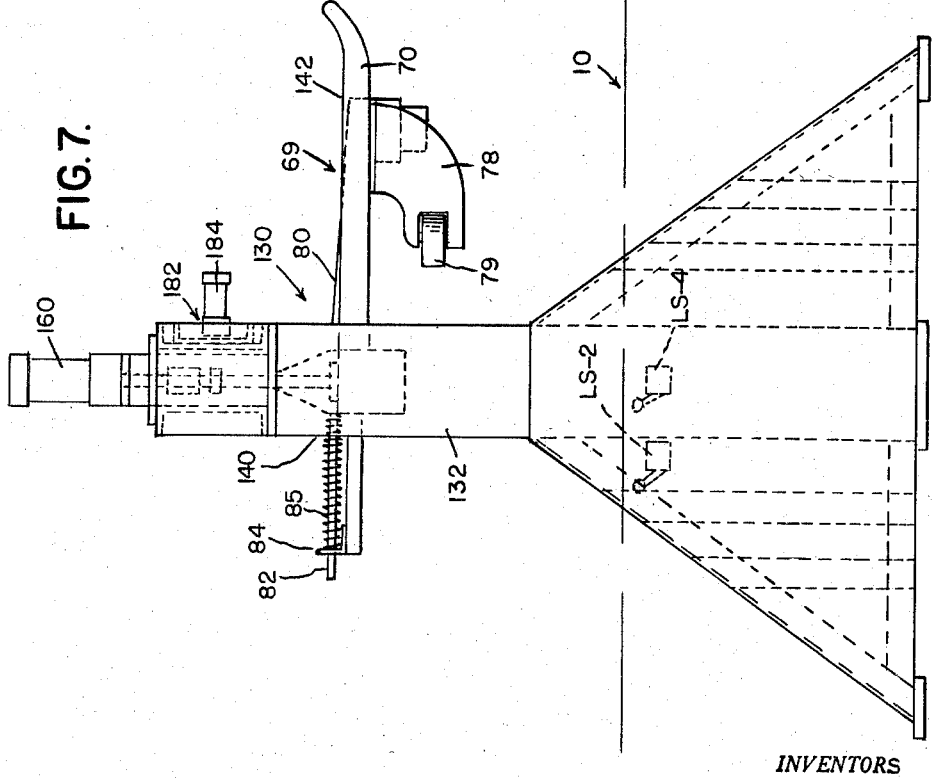
INVENTORS
JOHN E. KRIEBEL JR.
BY  MacKELLAR K. GRAHAM
ATTORNEYS United States Patent Office 2,817,394
Patented Dec. 24, 1957

2,817,394

CONVEYOR AND TIRE MOUNTING APPARATUS WITH AUTOMATICALLY ADJUSTING MOUNTING HEAD

John E. Kriebel, Jr., Milford, and MacKellar K. Graham, Detroit, Mich., assignors to Airway Products, Inc., Pontiac, Mich., a corporation of Michigan Application January 24, 1955, Serial No. 483,718

9 Claims. (Cl. 157—1.24)

This invention relates to apparatus for mounting tires on the rims of wheels and more particularly for mounting tires on the rims of wheels of different widths.

One object of this invention is to provide a tire mounting machine which is capable of automatically accommodating itself to mounting tires on wheels of different widths.

Another object of this invention is to provide a tire mounting machine which includes a conveyor for transporting wheels having tires partially mounted thereon, and also including a mounting head located adjacent to the conveyor for forcing the tire into fully mounted position with respect to the wheel as the wheel and tire assemblies move past the mounting head.

Still another object of the invention is to provide a tire mounting machine as described in the preceding paragraph in which the mounting head is adjustable toward and away from the conveyor in response to individual wheel width of the wheels moving along the conveyor.

Other objects of the invention will become apparent as the following description proceeds, especially when taken in conjunction with the accompanying drawings, wherein:

Figure 1 is a side elevational view of a tire mounting machine constructed in accordance with the present invention;

Figure 2 is a top plan view of the machine shown in Figure 1;

Figure 3 is a view of a control circuit for the apparatus shown in Figures 1 and 2;

Figure 7 is a side elevational view of a tire mounting machine having a modified construction;

Figure 8 is an enlarged view, partly in section, of a portion of the structure shown in Figure 7;

Figure 9 is a front elevation of the structure shown in Figures 7 and 8, the mounting head being omitted in the interest of clarity; and Figure 10 is a control circuit for the machine shown in Figures 7-9.

Figure 4:
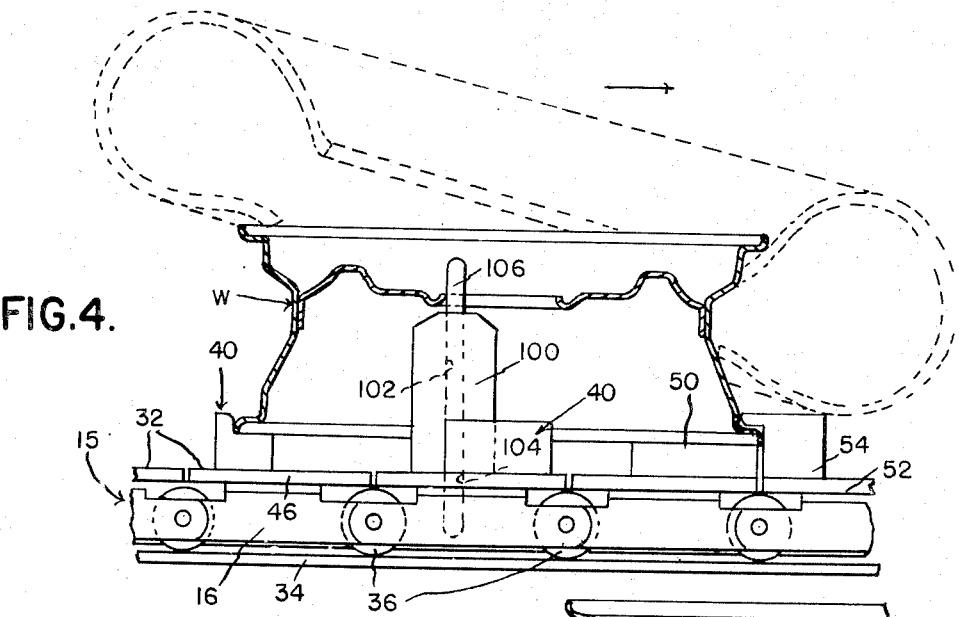
Figure 4 is an enlarged view, partly in section, of portions of Figure 1.

Referring now more particularly to the drawings and especially to Figures 1 and 2 thereof, the tire mounting machine illustrated in these figures includes a conveyor structure generally indicated at 10 and a mounting device 11. The conveyor structure comprises a frame 12 having supporting legs 14 for supporting the conveyor structure on a suitable platform or floor. The conveyor structure also comprises the endless conveyor 15 which includes a pair of laterally spaced conveyor chains 16 driven by a motor 18. The motor drives a sprocket shaft 20, which extends transversely of the frame and is journaled in bearings 21 secured to the frame, by means of a belt 22 which extends over the output shaft of the motor and around a pulley 24 secured to the shaft 20. The chains 16 extend around the laterally spaced driving sprockets 26 on shaft 20 and also extend around the laterally spaced idler sprockets 28 secured to the idler shaft 30 which extends transversely of and is journaled in bearings 31 on the frame 10. It will thus be seen that the motor 18 drives the laterally spaced chains 16 at the same rate of speed.

Extending between and secured to the opposed links of the two chains are the plates 32 which will be seen in Figures 1 and 2 to be disposed in closely spaced relationship to provide substantially a continuous platform for supporting articles on the upper reach of the conveyor. Extending beneath the upper reaches of each conveyor chain is a track 34 of I cross-section and it will be noted that rollers 36 are rotatably secured to the chains at the point of pivotal connection between adjacent links and these rollers run along the respective tracks to maintain the top reach of the conveyor in a level condition between the driving and driven sprockets.

At equally spaced intervals along the length of the conveyor, certain plates such as the plates designated 38 have secured to the top surfaces thereof, a pair of laterally spaced rests 40 for supporting thereon the diametrically opposite sides of a wheel. The wheel is supported upon the horizontally extending inner portion 42 of each rest and is retained against lateral shifting movement by the upwardly projecting portion 44 which is disposed on the outer side of the inner portion 42.

It will also be noted that the adjacent plate 46 has secured to the upper surface thereof a similar rest 40, and that the adjacent plate 48 to the opposite side of plate 38 has a pair of laterally spaced rest bars 50 diametrically opposed to rest 40 for supporting the wheel on the top surface thereof. The plate 52 beyond plate 48 has a block 54 secured to the top surface thereof having a portion 56 overhanging bars 50 and which retains the wheel against lateral shifting and against upward movement.

It will be apparent that the four rests are arranged in a circle at 90° intervals to support a wheel thereon. The wheels are supported upon the conveyor by the rests and also have tires partially mounted on the rims thereof in the manner illustrated.

The conveyor is operated to move the upper reach thereof forwardly or to the right as viewed in Figure 1 to bring the partially assembled wheel and tire assemblies into operative relation to the tire mounting device 11. The forward portion of the tire has the beads within the rim flanges while the remainder of the tire does not. The tire mounting device is supported above the conveyor adjacent one end thereof for movement generally toward and away from the conveyor. As shown in the drawings, the frame 12 of the conveyor structure includes a pair of rigid upright angle members 60 which are disposed at opposite sides of the frame adjacent the front end and have bearings 62 secured to the upper end portions thereof for rotatably receiving the opposite ends of a transverse shaft 64. A pair of vertical plates 66 have the front ends secured to shaft 64 and have their rear ends connected together by a transversely extending plate 68. The plates are rotatable about the axis of shaft 64 and are guided in their movement by the upright plates 67 on the conveyor at the inner side of each plate 66.

The mounting head 69 is carried by the transverse plate 68 and since the details of construction of the mounting head 69 form no part of the present invention, the mounting head structure will only be briefly described. As seen, the mounting head includes a central arm 70 which is rigidly secured to the plate 68 and extends rearwardly therefrom. The underside of the arm 70 is formed with a longitudinally extending channel-shaped groove 72 in which a block 74 is supported for sliding movement. Pivotally secured to the block 74 for swinging movement in a horizontal plane are a pair of arms 76 on the outer ends of which are provided the shoes 78 which are adapted to press the bead of a tire into fully mounted relationship with respect to a wheel as the partially mounted tire and wheel assembly moves past the mounting head.

Arms 80 have their rear ends pivoted to the outer ends of arms 76 for horizontal swinging and the front ends of the arms 80 are pivoted to the plate 68 for horizontal swinging. The block 74 has a forwardly extending rod 82 which extends through an aperture in the bracket 84 secured to transverse plate 68. The aperture in bracket 84 serves to guide the sliding movement of rod 82 as block 74 moves back and forth in the channel. Normally the block 74 is urged rearwardly or to the left by a coil spring 85 which encircles the rod and has one end abutting the front end of arm 70 and the other end secured to the rod. In Figure 2, the block is shown displaced a considerable distance forwardly of its normal position against the action of coil spring 85. The shoes 78 are thus enabled to move about the perimeter of a wheel in engagement with the tire bead pressing the latter into the rim of the wheel. The shoes are constrained to move around the perimeter of the wheel by the engagement of rollers 79 on the shoes with the wheel rim flanges.

The frame 65 of the mounting device is adapted to be rotated about the pivot axis determined by shaft 64 to raise and lower the mounting head 69 by a pair of hydraulic double acting cylinders 86 and 86'. The cylinder 86 is pivoted at 87 to the frame of the conveyor structure at one side and has a piston 88 therein movable in opposite directions by hydraulic fluid under pressure which may be introduced into the cylinder at opposite ends thereof by the fluid conduits 90 and 92. The piston rod is pivoted to one plate 66 of the frame 65 at 93. These fluid conduits alternately deliver hydraulic fluid under pressure to and exhaust fluid from opposite ends of the cylinder as determined by the four-way two-position valve assembly 94. Valve assembly 94 may be of the conventional solenoid controlled type in which the valve element is normally shifted in one direction by a spring to a position to deliver hydraulic fluid to one end of the cylinder and exhaust fluid from the other end. Energization of the solenoid 95 is effective to shift the valve element in the opposite direction against the action of the spring to reverse the fluid connections to the cylinder.

Cylinder 86' is exactly like cylinder 86 and has corresponding fluid conduits leading to opposite ends thereof. The piston rod of cylinder 86' is pivoted to the other plate 66 of the frame 65. The valve 94 and solenoid 95 may also serve cylinder 86' so that the cylinders work together.

In the present instance, the valve element is normally positioned to direct hydraulic fluid under pressure beneath the pistons of the cylinders 86 and 86' and for exhausting the cylinders at the opposite side of the pistons to turn the frame 65 in a clockwise direction and thereby raise the mounting head to the limit of upward movement thereof determined by the limit of upward movement of the pistons. Normally the head will be thus positioned to mount tires on wheels such as wheel W of a given width. However, should a wheel of a slightly smaller width move past the mounting head on the conveyor, the partially mounted tire will not be properly operated on by the mounting head to fully mount the same. Accordingly, in such circumstances it is desirable to bodily lower the mounting head 69 to effectively mount tires on wheels of lesser width.

Wheels, such as the wheel W having a given width, accordingly are moved along the conveyor and are subjected to the action of the mounting head to fully mount the tire thereon without moving the frame 65 from its normal upper limiting position. However, wheels, such as the wheel W', of a somewhat smaller width are effective to actuate mechanism for shifting the mounting device 11 and accordingly the head to its lower limiting position.

Figure 5:
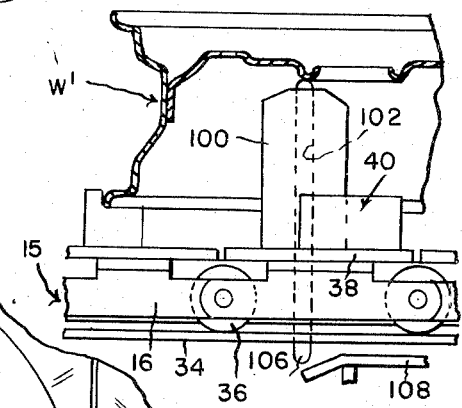
Figure 5 is similar to Figure 4 showing the parts in a different position, as a result of the wheel of reduced width supported on the conveyor.
Figure 6:
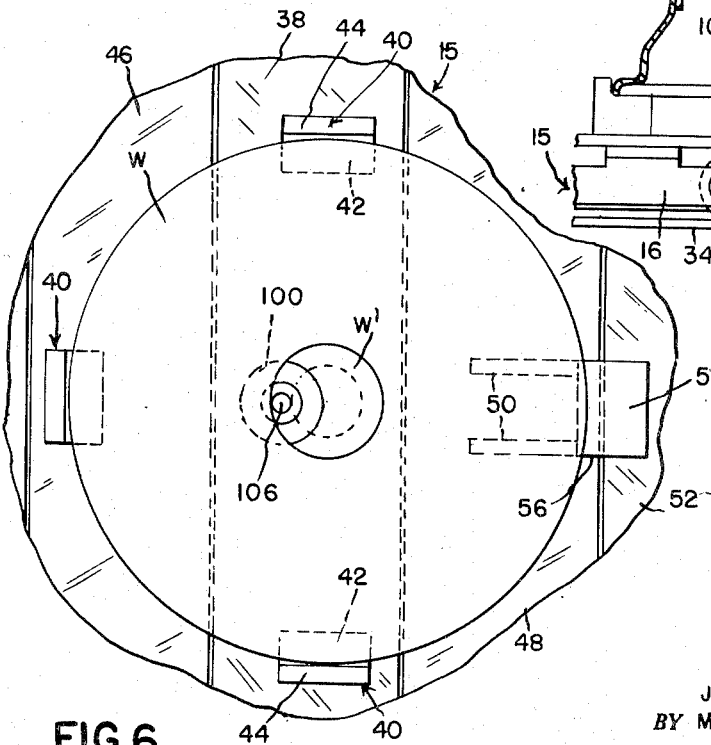
Figure 6 is a plan view of the structure shown in Figure 4, the wheel being shown only in outline.

As shown in Figures 1, 4 and 5, an upright member 100 is secured to the upper surface of each conveyor plate 38 slightly offset from the center determined by the four rests. The upright member has a vertically extending bore 102 which extends entirely therethrough and which registers with a through passage 104 in the plate 38. A plunger 106 is vertically slidable in the bore 102 and projects above the upright member and below the plate 38. This plunger is normally urged to its upper limiting position illustrated in Figure 1. A wheel W of relatively large width will not contact the plunger 106 when resting upon the supporting rests, since the central opening therein is such as to clear the plunger. However, the wheel W' of smaller width, has a smaller central opening so that a central part of the wheel body will engage the plunger 106 and depress the same.

In its depressed condition, the plunger is engageable with the lever 108, pivoted to the frame at 110 for vertical swinging movement. When engaged by the depressed plunger, lever 108 is swung downwardly to actuate the lever arm of normally open limit switch LS–1 to close the same. As seen in Figure 3, closing of limit switch LS–1 is operative to energize the relay R, thereby closing contact R–1 of the relay to close the shunt circuit 114 enabling the relay R to remain energized after the plunger 106 moves out of engagement with the lever 108 and the limit switch LS–1 is opened. Energization of relay R closes contact R–2 of the relay to complete the circuit to the coil 116 of the solenoid 95, energizing the same and shifting the valve element against the action of the spring to a position directing hydraulic fluid under pressure to the cylinder above the piston and exhausting the cylinder beneath the piston. The result is that the frame 65 for the head is swung in a counterclockwise direction to its lower limiting position prior to advance of the wheel W' into operative relationship to the head, so that the head is properly positioned to accommodate the wheel W' and to mount the tire thereon. The lower limit of movement of frame 65 is determined by a stop 118 secured to the conveyor frame and engageable by a screw 120 carried by frame 65. The screw 120 is threaded into a block 122 carried by frame 65 and may be vertically adjusted by merely rotating the screw to vary the lower limiting position of the head.

After the wheel W' has moved beyond the mounting head and the tire fully mounted thereon, the lever arm of a normally closed limit switch LS–2 is actuated by the depressed plunger 106 to open the limit switch LS–2 opening the shunt circuit, de-energizing the relay R and opening contacts R–1 and R–2. The coil 116 of the solenoid 95 is thereby de-energized, enabling the valve element to assume its normal position directing hydraulic fluid under pressure to the cylinder beneath the piston and exhausting the cylinder above the piston.

It will thus be seen that for wheels of a given width, such as wheels W, the control circuit is not affected by the passage of such wheels along the conveyor and the mounting head remains in its normal upper limiting position. However, when wheels of smaller width, such as W', are moved along the conveyor, the control circuit is operated to lower the head prior to advancement of the wheel into operative relationship to the head and to thereafter raise the head to its normal position.

It will be apparent that the actuation of the limit switches is responsive to the wheels W' of lesser width. In the present instance, the limit switches are actuated by reason of the fact that these wheels of less width have smaller central openings so as to actuate the plunger 106. It is obvious that other conditions of the wheel W' could be employed to accommodate the limit switches.

Thus, the plunger could be directly responsive to the transverse or width dimension of the wheel.

It will be understood that circular series of four rests are arranged at spaced intervals along the entire length of the endless conveyor. Any suitable means may be employed to deposit partially assembled tires and wheels at the rear of the conveyor and to remove the assembled tires and wheels beyond the mounting head.

Referring now to Figures 7–10, a tire mounting machine having a modified construction is illustrated. The conveyor structure 10 is exactly the same as the conveyor structure illustrated in Figures 1–6 and accordingly, it is only diagramatically shown in connection with the modified construction. The tire mounting device 130 is supported above the conveyor adjacent one end thereof for movement generally toward and away from the conveyor. The frame 12 of the conveyor structure includes a pair of rigid upright supports 132 which are disposed at opposite sides of the conveyor frame structure adjacent the front end of the latter. Spanning the upper ends of the supports 132 in spaced relation are a pair of channel-shaped members 134 and 136, and secured to the tops of the channel-shaped members and extending therebetween is a plate 138.

The tire mounting device 130 includes a supporting frame 140 and a mounting head 142. The mounting head extends rearwardly (to the right as seen in Figure 7) from the frame and is identical in construction to the mounting head 69 previously described and accordingly, corresponding parts are identified by the same numerals. Extending laterally outwardly from each side of the supporting frame 140 in longitudinally spaced relation are a pair of guide bushing brackets 144 which are formed with vertically extending apertures having secured therein suitable bushings. These brackets are vertically slidable along the guide posts 146 which are secured in spaced pairs on the inner sides of each support 132.

The mounting device is vertically reciprocable upon the guide posts 146 within the limits determined by the spaced stop devices 148. Each stop device comprises a tapping plate 150 suitably secured as by welding to the supporting frame 140 in laterally spaced relationship and having a vertically extending stop post 152 extending upwardly therefrom and through the lower flange 154 of the channel-shaped member 136. The stop post is loosely received in the aperture of flange 154 to enable the mounting device to reciprocate within the limits provided by stops 156 and 158. The stop 156 comprises a nut threaded on the upper end portion of the side post 152 and having a flange opposing the flange 154. The nut 156, which may be an elastic stop nut, thus limits the downward movement of the mounting device upon engagement of its flange with flange 154. The stop 158 is threaded on an intermediate portion of post 152 and is engageable with an annular tie plate secured to the underside of flange 154 and loosely receiving the guide post. It will be apparent that by adjusting the stops 156 and 158, the limits of vertical movement of the mounting device may be varied as desired.

The mounting device is raised and lowered by a double acting cylinder 160 having a piston 162 therein. The cylinder 160 extends vertically upwardly from and is secured to the top side of plate 138. The piston rod 164 extends through the lower end wall of the cylinder and the hole in plate 138 and is suitably connected to a connecting bracket 166 by a threaded coupling indicated at 168. The frame 140 is carried by bracket 166. The piston 162 is movable in opposite directions by hydraulic fluid under pressure which may be introduced into the cylinder at opposite ends thereof by the fluid conduits 170 and 172. These fluid conduits alternately deliver hydraulic fluid under pressure to and exhaust fluid from opposite ends of the cylinder as determined by the four-way, two-position valve assembly 174. Valve assembly 174 may be of the conventional solenoid controlled type in which the valve element is normally shifted in one direction by a spring to a position to deliver hydraulic fluid to one end of the cylinder and exhaust fluid from the other end. Energization of solenoid 176 is effective to shift the valve element in the opposite direction against the action of the spring to reverse the fluid connections to the cylinder.

In the present instance, the valve element of valve assembly 174 is normally positioned to direct hydraulic fluid under pressure beneath piston 172 and to exhaust the cylinder at the opposite side of the piston, thereby raising the mounting device to the limit of upward movement thereof determined by the stops 158. As in the previous embodiment, the mounting device is normally thus positioned to mount tires on wheels such as the wheels W of a given width since plunger 106 remains in its normal position in which the control circuit is not actuated. However, wheels of a smaller width such as the wheels W' are effective to depress the plunger 106 for adjusting the mounting device to its lower limiting position determined by stops 156.

As in the previous embodiment, the plunger 106 is depressed by wheel W' and the plunger 106 in turn engages and turns downwardly the lever 108 to close the normally open limit switch LS–1 to energize the relay R, thereby closing contact R–1 of the relay to close the shunt circuit enabling the relay R to remain energized after the plunger 106 moves out of engagement with the lever 108 and the limit switch LS–1 is opened (Figure 10). Energization of relay R also closes contact R–2 of the relay to complete the circuit to the coil 180 of solenoid 176, energizing the same and shifting the valve element of valve assembly 174 against the action of the spring to a position directing hydraulic fluid under pressure to cylinder 160 above the piston and exhausting the cylinder therebeneath. The mounting device is thus moved to its lower limiting position determined by stops 156 in order to accommodate the mounting head to the wheel of reduced width.

After the wheel W' has moved beyond the mounting head and the tire fully mounted thereon, the lever arm of a second limit switch LS–2 is actuated by the depressed plunger 106 to open the limit switch LS–2 opening the shunt circuit de-energizing the relay R and opening contacts R–1 and R–2. The coil of solenoid 176 is therefore de-energized enabling the valve element to assume its normal position directing hydraulic fluid under pressure to the cylinder beneath the piston and exhausting the cylinder above the piston to raise the mounting device to its normal upper limiting position.

In order to retain the mounting device in its lower limiting position against the tire mounting reaction forces, a locking mechanism generally indicated at 182 is employed. This mechanism includes a solenoid 184 secured to a channel 186. The channel has a plate 188 secured to the bottom side thereof and the assembly including the channel and plate are adjustably mounted within the channel of the channel-shaped member 136. Bolts 190 extend freely through the openings in the flanges of channel-shaped member 136 and have threaded engagement with the nuts 192 welded to the flanges to permit adjustment of the screws. The ends of these screws bear upon the upper and lower ends of the channel 186 to vertically adjust the latter.

The channel 186 and plate 188 have aligned apertures for accommodating the plunger 194 of the solenoid 184. An enlarged opening 196 is also formed in the bottom of the channel-shaped member 136 to accommodate the plunger in various positions of vertical adjustment of the channel 186.

In Figure 8, the plunger 194 is shown in solid lines in the retracted position and is shown extended in dotted lines. When the plunger is extended, it is adapted to extend through an opening 198 in the bracket 166 to lock the same against movement.

In accordance with the present invention, the solenoid is normally de-energized in which condition the plunger is retracted and is energized by the mounting device upon initial downward movement thereof. In detail, when the mounting device begins to move downwardly toward its lower limit, a part 199 thereon engages the lever of normally open limit switch LS-3 to close the latter and energize relay RR thereby closing the contacts RR-1 and RR-2 of the relay. Closing of contact RR-1 closes the shunt circuit to maintain the relay energized even after the part 199 releases limit switch LS-3 as it moves downwardly permitting the latter to open, and also closing of contact RR-2 energizes the coil 185 of solenoid 184 to extend the plunger 194 into the opening 198 of bracket 166. The plunger will probably be forced outwardly before the mounting device has been lowered to a position where hole 198 is aligned with the plunger, but no problem is presented since the plunger will merely press against bracket 166 until the hole 198 comes into alignment and will then snap into the hole. Some adjustment may have to be made in the vertical position of the solenoid 184 to align the plunger thereof with the opening 198 in the lowermost position of bracket 156.

After the tire has been fully mounted on the wheel W' and the assembly has moved beyond the mounting device, the depressed plunger 106 engages the lever of normally closed limit switch LS-4 to momentarily open the latter, de-energizing the relay RR, and thereby opening contact RR-2 and deenergizing solenoid 184. The plunger 194 is retracted so that the mounting frame is free to be raised upon subsequent opening of limit switch LS-2. In this connection, it is to be noted that limit switch LS-4 is positioned for actuation by plunger 106 far enough in advance of switch LS-2 that plunger 194 is retracted before switch LS-2 is opened, and thus the mounting device is released before it is raised.

The lever of limit switch LS-3 is normally spring-urged to the position of Fig. 8. Upward movement of the mounting device will cause part 199 to engage this lever, but movement of the lever upwardly does not operate to close this switch. The switch is closed only when its lever is moved downwardly by downward movement of the mounting device.

What we claim as our invention is:

1. A tire mounting machine comprising a conveyor adapted to carry wheels having tires partially mounted on the rims of the wheels, a mounting head adjacent the path of said conveyor constructed and arranged to force the rest of the tires into mounted position on the rims of the wheels as the wheels move past said mounting head on said conveyor, said head being movable to different positions toward and away from said conveyor, means responsive to wheels of one width and operated by the latter wheels in advance of said mounting head for moving said head to one position to mount tires on the wheels of said one width, and means responsive to wheels of said one width and operated by the latter wheels beyond said head for moving said head to another position for mounting tires on wheels of another width.

2. A tire mounting machine comprising a conveyor adapted to carry wheels having tires partially mounted on the rims of the wheels, a mounting head adjacent the path of said conveyor constructed and arranged to force the rest of the tires into mounted position on the rims of the wheels as the wheels move past said mounting head on said conveyor, means for moving said head in opposite directions toward and away from said conveyor between a first position for mounting tires on wheels of one width and a second position for mounting tires on wheels of another width, means responsive to wheels of said one width and operated by the latter wheels in advance of said head for actuating said moving means to move said head in one direction to said first position and means responsive to wheels of said one width and operated by the latter wheels beyond said head for actuating said moving means to move said head in the opposite direction to said second position.

3. A machine as defined in claim 2 in which said head is mounted for swinging movement about a horizontal axis.

4. A machine as defined in claim 2 including means responsive to movement of said head to its first position for positively locking said head in the first position, and means responsive to wheels of said one width and operated by the latter wheels beyond said head to render the locking means inoperative.

5. A machine as defined in claim 4 in which said locking means comprises a solenoid operated plunger movable into and out of locking engagement with said head.

6. A machine as defined in claim 5 in which said head is mounted for sliding movement on vertical posts.

7. A tire mounting machine comprising a conveyor adapted to carry wheels having tires partially mounted on the rims of the wheels, a mounting head adjacent the path of said conveyor constructed and arranged to force the rest of the tires into mounted position on the rims of the wheels as the wheels move past said mounting head on said conveyor, said head being adjustable to mount tires on wheels of different widths and normally adjusted to mount tires on wheels of one width, means responsive to wheels of another width and operated by the latter wheels in advance of said mounting head for adjusting said head to mount tires on wheels of said other width, and means responsive to wheels of said other width and operated by the latter wheels beyond said head for adjusting said head to mount tires on wheels of said one width.

8. A tire mounting machine comprising a conveyor adapted to carry wheels having tires partially mounted on the rims of the wheels, a mounting head adjacent the path of said conveyor constructed and arranged to force the rest of the tires into mounted position on the rims of the wheels as the wheels move past said mounting head on said conveyor, said head being adjustable to mount tires on wheels of different widths and normally adjusted to mount tires on wheels of one width, means responsive to wheels of another width and operated by the latter wheels in advance of said mounting head for adjusting said mounting head to mount tires on the wheels of said other width, and means operative after said wheels of said other width pass beyond said mounting head for adjusting said head to mount tires on wheels on said one width.

9. A tire mounting machine comprising a conveyor adapted to carry wheels having tires partially mounted on the rims of the wheels, a mounting head adjacent the path of said conveyor constructed and arranged to force the rest of the tires into mounted position on the rims of the wheels as the wheels move past said mounting head on said conveyor, said head being movable in opposite directions toward and away from said conveyor between a first position for mounting tires on wheels of one width and a second position for mounting tires on wheels of another width, said head being normally located at said first position, and means responsive to wheels of said other width and operated by the latter wheels in advance of said mounting head for moving said head to said second position for mounting tires on wheels of said other width.

References Cited in the file of this patent

UNITED STATES PATENTS

| 2,661,053 | Mullen | Dec. 1, 1953 |
| 2,665,747 | Harrison | Jan. 12, 1954 |